United States Patent
Smith et al.

(10) Patent No.: US 7,181,245 B2
(45) Date of Patent: Feb. 20, 2007

(54) WIRELESS TRANSMITTER, TRANSCEIVER AND METHOD

(75) Inventors: Martin S. Smith, Chelmsford (GB); Chris R. Ward, Bishops Stortford (GB); Fiona M. Wilson, Spellbrook (GB); Keith S. Wilson, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 345 days.

(21) Appl. No.: 10/180,502

(22) Filed: Jun. 27, 2002

(65) Prior Publication Data

US 2004/0198292 A1 Oct. 7, 2004

(51) Int. Cl.
*H04Q 7/20* (2006.01)

(52) U.S. Cl. .................. 455/562.1; 455/101; 455/218.1

(58) Field of Classification Search ............. 455/562.1, 455/522, 101, 296, 450, 455, 464, 137, 132, 455/272, 273, 277.1, 278.1; 342/354, 361, 342/373; 375/299
See application file for complete search history.

(56) References Cited

U.S. PATENT DOCUMENTS

| | | | |
|---|---|---|---|
| 5,493,306 A | 2/1996 | Rudish et al. | 342/371 |
| 5,832,389 A | 11/1998 | Dent | 455/562 |
| 6,005,516 A * | 12/1999 | Reudink et al. | 342/375 |
| 6,057,806 A * | 5/2000 | Lopez | 343/890 |
| 6,094,165 A * | 7/2000 | Smith | 342/373 |
| 6,141,335 A | 10/2000 | Kuwahara et al. | |
| 6,167,286 A * | 12/2000 | Ward et al. | 455/562.1 |
| 6,314,305 B1 * | 11/2001 | Solondz et al. | 455/562.1 |
| 6,351,237 B1 * | 2/2002 | Martek et al. | 342/361 |
| 6,768,913 B1 * | 7/2004 | Molnar et al. | 455/562.1 |
| 2001/0031647 A1 * | 10/2001 | Scherzer et al. | 455/562 |
| 2002/0034270 A1 | 3/2002 | Ylitalo | |
| 2002/0072393 A1 | 6/2002 | Deane et al. | |
| 2003/0017853 A1 * | 1/2003 | Kanamaluru er al. | 455/562 |
| 2003/0087640 A1 | 5/2003 | Chen et al. | |
| 2003/0124994 A1 * | 7/2003 | Ylitalo | 455/91 |
| 2004/0092291 A1 * | 5/2004 | Legnain et al. | 455/562.1 |

FOREIGN PATENT DOCUMENTS

| | | |
|---|---|---|
| EP | 0798872 | 3/1997 |
| GB | 2300549 | 4/1996 |
| GB | 2335572 | 8/1998 |
| WO | 9940648 | 8/1999 |
| WO | 0139395 | 11/2000 |
| WO | 0189112 | 5/2001 |
| WO | 0199240 | 6/2001 |

* cited by examiner

*Primary Examiner*—Edward F. Urban
*Assistant Examiner*—Blane J. Jackson

(57) ABSTRACT

Provided is an apparatus adapted to transmit a first channel on at least two adjacent fixed beams of a plurality of fixed beams defining a coverage area, with each pair of adjacent fixed beams of the plurality of fixed beams partially overlapping and having substantially orthogonal polarizations. The apparatus has a respective transmitter adapted to transmit on each of the plurality of fixed beams a respective unique composite signal, each composite signal containing said first channel and a respective unique traffic channel.

20 Claims, 4 Drawing Sheets

WIRELESS TRANSMITTER, TRANSCEIVER AND METHOD

FIELD OF THE INVENTION

This invention relates in general to cellular communication systems and in particular to wireless transmitters, transceivers and methods.

BACKGROUND OF THE INVENTION

In order to satisfy the demand for transmission capacity within an available frequency band allocation, digital cellular systems divide a particular geographic area to be covered into a number of cell areas. A cell consists of a base station from which mobile units within the cell access the cellular system. It is the base station capacity that typically defines the optimal cell coverage area. The capacity of a base station is ideally as large as possible so that each cell can serve as an access point to the cellular system to as many mobile units as possible over a large area.

One method of achieving an increase in capacity is to replace a wide beamwidth antenna with an antenna array that provides a number of narrower beamwidth beams that cover the area of the original beam. Referring to FIG. 1, a conventional wireless communication cell 100 is shown comprising three adjacent sectors, alpha 102, beta 104 and gamma 106. Each cell comprises an antenna tower platform 120 located at the intersection of the three sectors. The antenna tower platform 120 has three sides forming an equallateral triangle. Each sector has three antennas, (only antennas in sector alpha 102 are shown) a first antenna 114, a second antenna 116, and a third antenna 112 mounted on a side of the antenna tower platform 120. The three antennas of each sector produce a corresponding set of three beams (only beams in sector alpha 102 are shown) including a first beam 108, a second beam 110 and a third beam 112. The three beams 108, 110, 112 are adjacent with some overlap. The three sectors alpha 102, beta 104 and gamma 106 are identical in structure with respect to antennas and beams. The signal for a particular user can then be sent and received only over the beam or beams that are useful for that user. If the pilot channel on each beam is unique (e.g. has a different PN (pseudo-random noise) offset) within each sector then the increase in capacity is limited due to interference between reused pilot channels in different cells.

An improvement is to use multiple narrow beams for the traffic channels and transmit the overhead channels (pilot, synch, and paging channels) over the whole sector so that the overhead channels are common to all the narrow beams used by the traffic channels in that sector. This leads to substantial gains in capacity. It is therefore desirable that the overhead channels be broadcast over the area covered by the original wide beam.

Broadcasting the overhead channels over an entire sector can be accomplished by using the original wide beam antenna or by transmitting the overhead channels synchronously using the same multiple narrow beams used to transmit and receive the traffic channels. However, a problem common to both of these arrangements is that both require the expense of extra hardware, complex calibration equipment and algorithms to match the phases of the overhead channels to the phases of the traffic channels.

Currently, multiple beams of one polarization are used to provide coverage for a single sector, with a second polarization used for diversity purposes. When a full sector transmission is required, as for the overhead channels, transmission of identical signals on all beams simultaneously can create spatial interference nulls at the beam crossover points, assuming that the equipment has not been carefully calibrated (so the relative phases are not controlled). An approach that is proposed in commonly assigned U.S. patent application Ser. No. 09/733,059, entitled "Antenna Systems With Common Overhead For CDMA Base Stations" and filed on Dec. 11, 2000 by McGowan et al, provides a method of phase cycling of the beams to ensure that a spatial null only persists for a short duration of time.

There is thus a desire to provide an antenna array that uses fixed narrow beams for transmitting and receiving the traffic channels on multiple beams and may broadcast the common pilot channel over all of the sector using the same antenna array. Furthermore, it would be advantageous to provide an antenna system that did not require complex calibration and adjustment to maintain performance over time and temperature.

SUMMARY OF THE INVENTION

Advantageously, embodiments of the invention allow the distinctive interference which would otherwise occur when transmitting the same signal on overlapping beams is avoided through the use of orthogonal polarizations.

According to one broad aspect, the invention provides an apparatus adapted to transmit a first channel on at least two adjacent fixed beams of a first plurality of fixed beams defining a coverage area, with each pair of adjacent fixed beams of said plurality of fixed beams partially overlapping and having substantially orthogonal polarizations.

In some embodiments, the apparatus further comprises a respective transmitter adapted to transmit on each of said first plurality of fixed beams a respective unique composite signal, each composite signal comprising said first channel and a respective at least one unique traffic channel.

In some embodiments, the apparatus further comprises the apparatus adapted to transmit CDMA signals In some embodiments, the apparatus further comprises a respective receiver coupled to receive a respective receive signal over each of said first plurality of fixed beams.

In some embodiments, the apparatus comprises a dual polarization array adapted to produce all of the beams of the first and second pluralities of beams In some embodiments, the apparatus is further adapted to receive over a second plurality of fixed beams comprising a corresponding fixed beam for each fixed beam of said first plurality of fixed beams which is substantially co-extensive with the fixed beam of the first plurality of fixed beams and has a respective polarization which is substantially orthogonal to the polarization of the fixed beam of the first plurality of fixed beams.

In some embodiments, the respective polarization of each of the first and second plurality of fixed beams is one of two substantially orthogonal polarizations.

In some embodiments, the respective polarization of each of the first and second plurality of fixed beams is one of two substantially orthogonal polarizations, and each of the beams from both the first and second plurality of fixed beams are preferably transmitted from a single dual polarization antenna array capable of providing two substantially orthogonal polarizations simultaneously.

In some embodiments, the apparatus further comprises a first antenna array and a second antenna array, the first antenna array being adapted to produce each fixed beam of said first and second plurality of fixed beams having a first of said two substantially orthogonal polarizations and the second antenna array being adapted to produce each fixed beam of said first and second plurality of fixed beams having a second of said two substantially orthogonal polarizations.

In some embodiments, the apparatus further comprises a first multiple fixed beam former connected to the first antenna array and a second multiple fixed beam former connected to the second antenna array.

In some embodiments, the apparatus further comprises a fixed beam forming matrix connected to the first antenna array and the second antenna array.

In some embodiments, the apparatus further comprises a respective receiver coupled to receive for each of said first and second pluralities of fixed beams a respective receive signal over the fixed beam.

In some embodiments, the apparatus further comprises a respective receiver coupled to receive for each of said first and second pluralities of fixed beams a respective receive signal over the fixed beam.

In some embodiments, the apparatus further comprises for each pair of fixed beams comprising a fixed beam of said first plurality of the corresponding fixed beam of the second plurality of antennas, a respective combiner adapted to perform diversity combining of the receive signals received over the pair of fixed beams.

In some embodiments, the apparatus further comprises for each pair of fixed beams comprising a fixed beam of said first plurality of the corresponding fixed beam of the second plurality of antennas, a respective combiner adapted to perform diversity combining of the receive signals received over the pair of fixed beams.

According to another broad aspect, the invention provides a method which involves transmitting a first channel on at least two adjacent fixed beams of a first plurality of fixed beams defining a coverage area, with each pair of adjacent fixed beams of said plurality of fixed beams partially overlapping and having substantially orthogonal polarization.

In some embodiments, the method further comprises transmitting on each of said first plurality of fixed beams a respective unique composite signal, each composite signal comprising said first channel and a respective at least one unique traffic channel.

In some embodiments, the first channel is a CDMA signal.

In some embodiments, the method further comprises receiving a respective receive signal over each of first said plurality of fixed beams.

In some embodiments, the method further comprises receiving a respective receive signal over each of a second plurality of fixed beams comprising a corresponding fixed beam for each fixed beam of said first plurality of fixed beams which is substantially co-extensive with the fixed beam of the first plurality of fixed beams, and has a respective polarization which is substantially orthogonal to the polarization of the fixed beam of the first plurality of fixed beams.

In some embodiments, the respective polarization of each of the first and second plurality of fixed beams is one of two substantially orthogonal polarizations.

In some embodiments, the method further comprises receiving a respective receive signal over each of said first plurality of fixed beams.

In some embodiments, the method further comprises performing, for each pair of fixed beams comprising a fixed beam of said first plurality of the corresponding fixed beam of the second plurality of antennas, diversity combining of the receive signals received over the pair of fixed beams.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
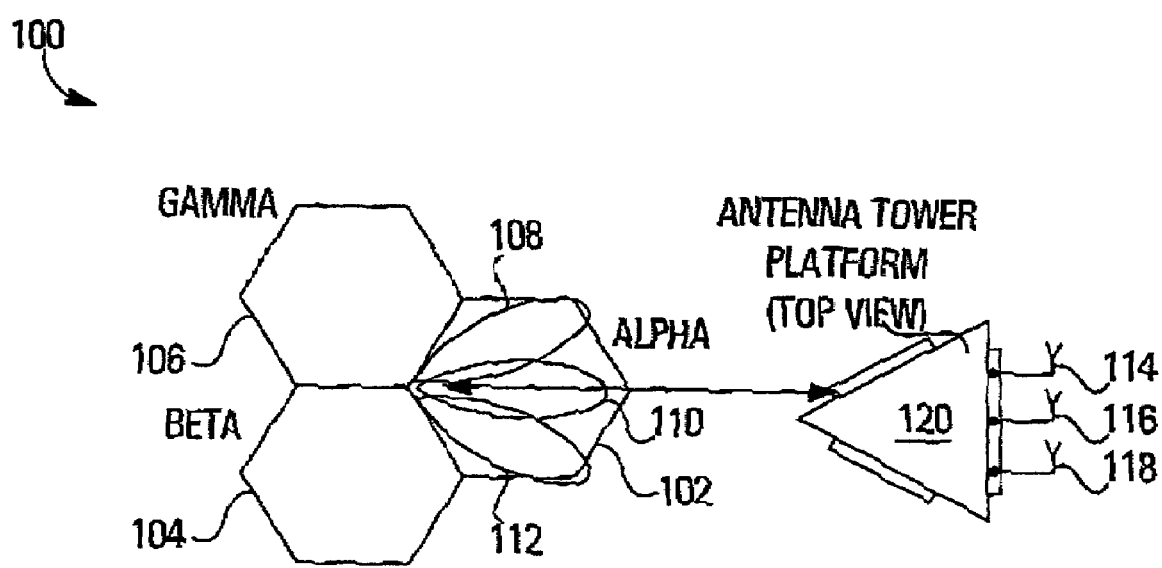
FIG. 1 is a diagram of a conventional wireless communication cell.
Figure 2:
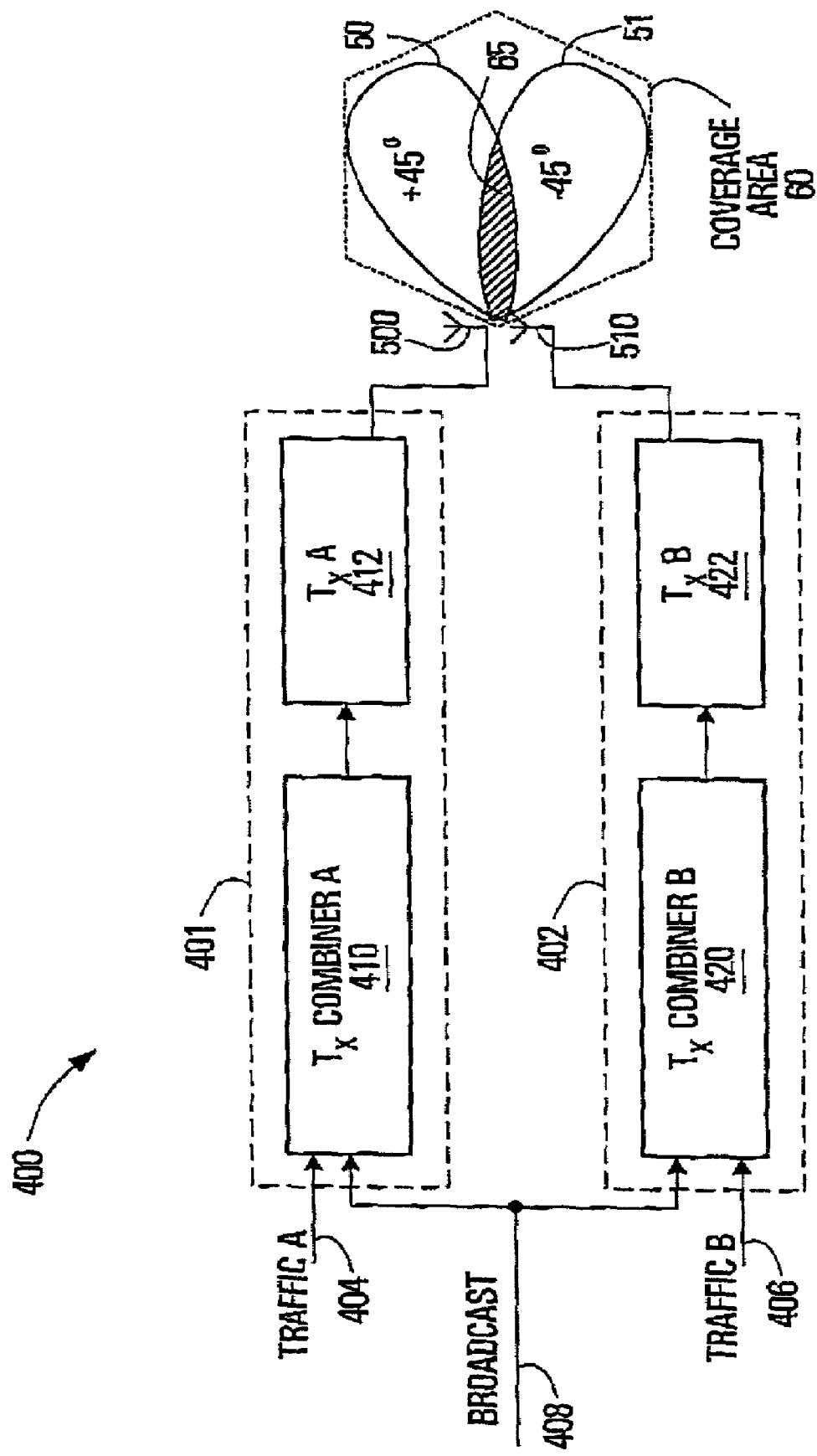
FIG. 2 is a schematic of wireless transmission system provided by an embodiment of the invention.

In order to transmit unique traffic channels on each beam in a coverage area while simultaneously transmitting common overhead or overhead channels (e.g. pilot, sync, and paging channels) over all of the beams in the coverage area, a wireless transmission system using fixed beams that does not require complex calibration equipment and algorithms is provided. FIG. 2 illustrates a wireless transmission system 400 provided by an embodiment of the invention that may be deployed within a coverage area 60.

The wireless transmission system 400 has a first transmission signal chain 401 and a second transmission signal chain 402. The first transmission signal chain 401 has in series a transmission signal combiner A 410, a transmitter A 412 and an antenna 500. Similarly, the second transmission signal chain 402 has a transmission signal combiner B 420, a transmitter B 422 and an antenna 510. It would be understood by those skilled in the art that an additional combination of hardware, software and firmware would be required to support the wireless transmission system 400 to make it operable. Illustrated in FIG. 2 are only those components necessary to discuss aspects of the invention.

The wireless transmission system 400 operates to over the coverage area 60 with two fixed beams 50 and 51 originating from transmission signal chains 401 and 402 respectively. At least one unique traffic channel is transmitted through each transmission signal chain 401 and 402. Simultaneously, both transmission signal chains 401 and 402 transmit a common overhead channel so that the overhead channel can be received anywhere within the coverage area 60. Within each transmission signal chain 401 and 402 at least one unique traffic channel is combined with the common overhead channel in the respective transmission signal combiners 410 and 420 before transmission via the fixed beams 50 and 51 respectively.

Referring to the example illustrated in FIG. 2, the transmission signal chain 401 is used to transmit a first unique traffic channel TRAFFIC A 404 and the common overhead channel BROADCAST 408 and the transmission signal chain 402 is used to transmit a second unique traffic channel TRAFFIC B 406 and the common overhead channel BROADCAST 408. The fixed beams 50 and 51 are launched from antennas 500 and 510 respectively. It should be stressed that the at least one unique traffic channel transmitted through each transmission signal chain 401 and 402 can only be received in the region of the coverage area 60 that is covered by the fixed beams 50 and 51 respectively. That is, traffic channel TRAFFIC A can only be received in the region of the coverage area covered by fixed beam 50 and the same is true for traffic channel TRAFFIC B and fixed beam 51. However, since the combination of fixed beams 50 and 51 provide coverage to the entire coverage area 60, the common overhead channel BROADCAST 408 can be received everywhere within the coverage area 60.

In order to avoid any destructive combination of the simultaneous transmissions containing the common overhead channel in an area 65 where the two fixed beams 50 and 51 overlap, the fixed beam 50 is launched with a transmission polarization orthogonal to that of the fixed beam 51. For example beam 50 could be transmitted with 45° polarization, and beam 51 could be transmitted with −45° polarization. The combination of the received signals from the two beams 50,51 in their overlap region 65 will have a variable polarization but will almost never see destructive interference of the magnitude that would substantially lead to the cancellation of the power of the received signal in the overlap region 65. Polarization mismatch with the mobile antenna may occur, but this is no different to a full sector single polarization transmission system with polarization mixing in the propagation path. In other words, a sector covered by a single wide-beam would also be influenced by polarization mismatch between the base station antenna and the mobile antenna.

FIG. 2 provides a single example embodiment of the invention. More generally, an embodiment of the invention provide for a coverage area in which an arbitrary number of fixed beams are employed, each fixed beam having a launch (transmission) polarization that is substantially orthogonal to the adjacent fixed beams. Individual traffic channels are sent on each beam, and a common overhead channel is sent on all beams, or more generally at least two of the beams. The result will be that within the region where the adjacent fixed beams overlap there will be only minimal signal degradation to the common signal channel transmitted on adjacent beams due to destructive combination of the common signal channel received from adjacent beams.

Figure 3:
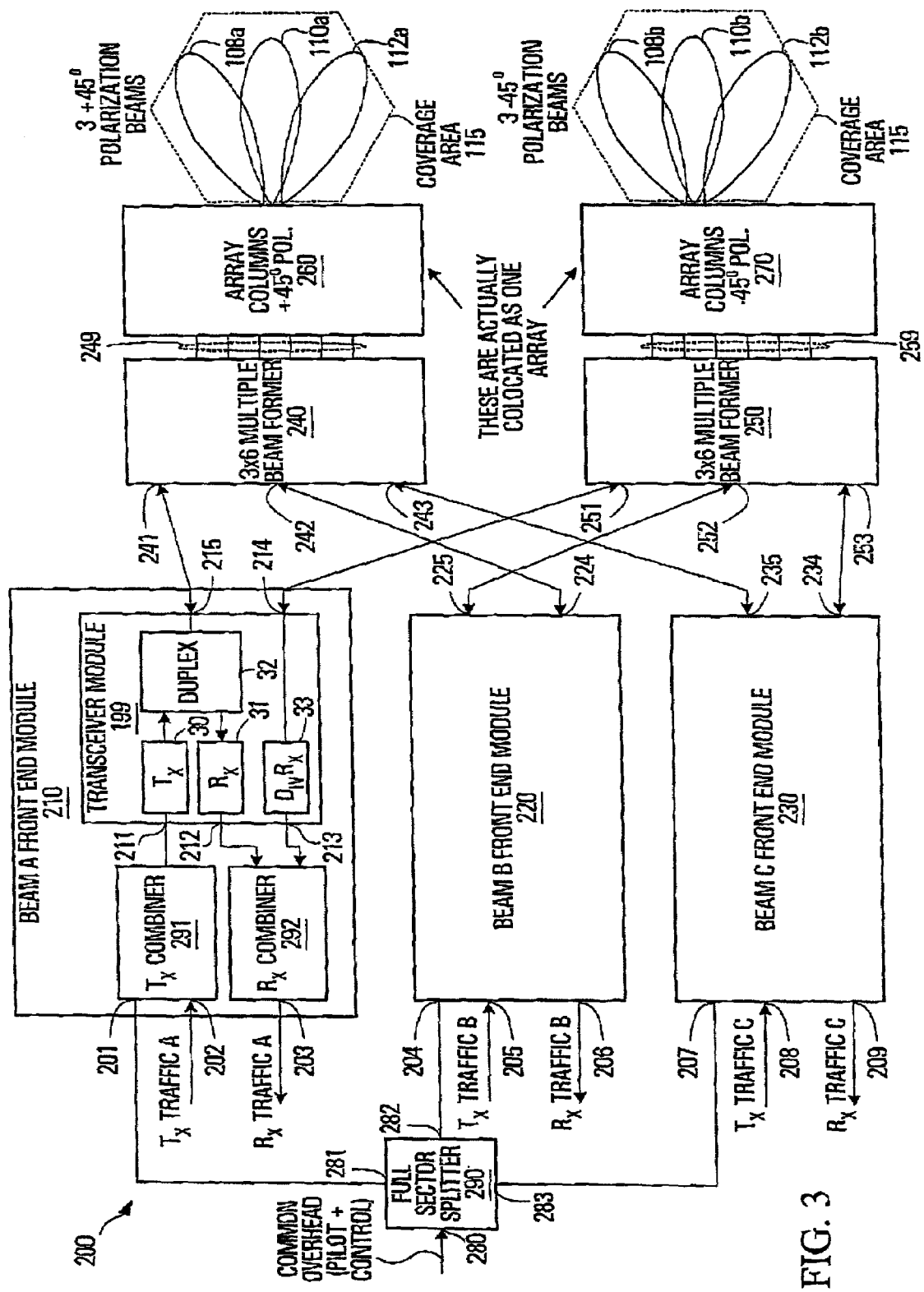
FIG. 3 is a schematic of a wireless transceiver system provided by an embodiment of the invention.

FIG. 3 illustrates a more detailed example of a wireless transceiver system 200 that may be deployed within a coverage area according to an embodiment of the invention that operates to provide sector wide coverage for the overhead channels on the downlink and reception diversity on the uplink.

The system 200 of FIG. 3 has a full sector splitter 290 connected to receive a common overhead signal 280 which might for example be some combination of pilot and control information. The common overhead signal is input to each of three beam front end modules, namely beam A front end module 210, beam B front end module 220, and beam C front end module 230. The beam front end modules are detailed below.

Each beam front end module is also connected to receive a respective transmit traffic signal. Thus, beam A front end module receives at input port 202 Tx traffic A, beam B front end module receives at input port 204 Tx traffic B, and beam C front end module 230 receives at input port 208 Tx traffic C. Each beam front end module also outputs a respective receive traffic signal. Thus, beam A front end module outputs at output port 203 Rx traffic A, beam B front end module outputs at output port 206 Rx traffic B, and beam C front end module 230 outputs at output port 209 Rx traffic C.

Each of the beam front end modules is connected bi-directionally to a respective input beam-port of each of two multiple beam formers 240,250. More specifically, beam A front end module 210 output 215 is connected bi-directionally to beam-port 241 of the first multiple beam former 240, and beam A front end module 210 output 214 is connected bi-directionally to beam-port 251 of the second multiple beam former 240. Similarly, beam B front end module 220 output 225 is connected bi-directionally to beam-port 242 of the first multiple beam former 240, and beam B front end module 220 output 224 is connected bi-directionally to beam-port 252 of the second multiple beam former 240. Finally, beam C front end module 230 output 235 is i connected bi-directionally to beam-port 243 of the first multiple beam former 240, and beam C front end module 230 output 234 is connected bi-directionally to beam-port 253 of the second multiple beam former 240.

Each of the multiple beam formers 240, 250 is connected to a respective antenna array 260, 270 through respective sets of antenna ports 249 and 259. The first antenna array 260 operates to provide a coverage area 115 with a first set of three fixed beams 108a, 110a, 112a at +45° polarization. Similarly, the second antenna array 270 operates to provide the same coverage area 115 with a second set of three fixed beams 108b,110b,112a at −45° polarization which are each substantially coextensive with corresponding beams of the first set of three fixed beams. More generally, any orthogonal polarizations may be employed.

The details of the beam A front end module 210 will now be described by way of example, the other two beam front end modules being the same. Beam A front end module 210 has a Tx combiner 291 which operates to combine the common overhead signal and the Tx traffic A signal and output this to an input 211 of a transceiver module 199 which connects to a transmitter component 30 within the transceiver module 199. The transmitter component 30 is connected through a duplexer 32 in the forward direction to beam-port 241 of the first multiple beam former 240. In the reverse direction, beam-port 241 of the first multiple beam former 240 is connected through the duplexer 32 to a receiver component 30 in the transceiver module 199 an output 212 of which is connected to an Rx combiner 292. The duplexer 32 operates to select a transmission signal band or receive signal band for the appropriate routing of Tx and Rx signals through the transceiver module 199. The transceiver module 199 also has a diversity receiver component 33 which connects the first beam-port 251 of the second multiple beam former to the Rx combiner 292.

Beam B front end module 220 is connected in the same manner, excepting that its diversity receive signals will be received from beam-ports 242 and 252 of the first and second multiple beam formers 240, and its transmit signals will be output to beam-port 252 of the second multiple beam former. Similarly, Beam C front end module 230 is connected in the same manner, excepting that its diversity receive signals will be received from beam-ports 243 and 253 of the first and second multiple beam formers 240, 250 and its transmit signals will be output to beam-port 242 of the first multiple beam former. It can be seen in the static configuration of FIG. 3 that in fact, beam-ports 251, 242 and 253 do not need to be bi-directional since these are only used for receive signals.

Although the present embodiment has been described as having two antenna arrays providing two sets of co-extensive fixed-beams such that each set of fixed beams has a substantially orthogonal polarization to the other set of fixed-beams, in another embodiment the two sets of fixed-beams are provided by a single dual polarization antenna array capable of providing two sets of co-extensive fixed beams that are substantially orthogonal in terms of their respective polarizations.

In operation, in the forward direction, the common overhead signal 280 is sent to each of the three beam front end modules 210, 220, 230 and is transmitted on beam 108a, 110b and 112a. Adjacent beams of this set have orthogonal polarization so that destructive interference is avoided. Tx traffic A is transmitted only on beam 108a. Tx traffic B is transmitted only on beam 110b, and Tx traffic C is transmitted only on beam 112a.

In the reverse direction, signals received on coextensive fixed beams 108a and 108b, are combined in the diversity combiner 292 of the beam A front end module 210 and output as Rx traffic A.

Similarly, signals received on coextensive fixed beams 110a and 110b are combined in the diversity combiner (not shown) of the beam B front end module 220 and output as Rx traffic channel B.

Finally, signals received on coextensive beams 112a and 112b are combined in the diversity combiner (not shown) of the beam C front end module 230 and output as Rx traffic channel C.

It is noted that Rx traffic channel A may contain signal content from mobile units in the area of beams 108a, 108b, but may also contain signal content from mobile units, either in the area of beams 110a, 110b where they overlap with beams 108a, 108b or in areas where obstructions result in multipath, and a similar situation exists for the other received traffic signals. Upstream processing (not shown) may be provided to resolve these signals if necessary.

The multiple beam formers operate to simultaneously direct a Tx signal received into one of its beam-ports to one of the three fixed beams provided by the antenna array. The fixed beam selected is dependent upon which beam-port the Tx signal is received into. For example, the multiple beam former 240 will direct the Tx signal received into beam-port 241 onto fixed beam 108a by way of amplitude and phase shaping, while simultaneously directing the Tx signal received into beam-port 243 onto fixed beam 112a. Similarly, multiple beam former 250 will direct a Tx signal received into beam-port 252 onto fixed beam 110b. Beam-ports 241, 252 and 243 are also able to send Rx signals in the reverse direction after these Rx signals have been coupled from fixed beams 108a, 110b and 112a respectively. As mentioned above, beam-ports 251, 242 and 253 are only used for receive signals and thus only receive Rx signals coupled from fixed beams 108b, 110a and 112b respectively.

Additionally, information originally scheduled to by transmitted on Tx traffic A could be re-routed by backend electronics (not shown) onto Tx traffic B (or Tx traffic C) if the mobile receiver has moved into the coverage area of a different beam. Similar re-routing could be done for Tx traffic B and Tx traffic C.

Although two antenna arrays forming three beams per polarization per sector are used in this example of the preferred embodiment, any number of beams and antenna arrays per sector greater than one may be used while remaining within the scope of the invention.

The received signal strength of a pilot channel (or any other overhead channel, e.g., a control channel) at any point in the coverage area is determined by the vector sum of all pilot channel signals received from each beam. Both the wireless transmission system 400 and the wireless transceiver system 200 provide systems in which adjacent beams are preferably of alternating polarizations. A coverage area, such as a sector of a cell, covered by adjacent narrow beams with alternating polarizations results in a combined radiation pattern in the coverage area that is substantially a constant amplitude but has an undetermined polarization. In other words, alternating polarization combines beams with orthogonal polarizations, having unknown relative phase, that in turn produce a combined radiation pattern having a substantially constant amplitude across the sector; however, the polarization of the combined radiation pattern is variable. The relative phases are unknown since no effort has been made to calibrate the internal connections of the components that comprise the wireless transceiver system 200 and the wireless transmission system 400. The lack of calibration results from internal signal paths that have uncontrolled phase delays. However, this is the situation the invention is intended to operate within since calibration is a lengthy and costly installation feature in a wireless system, and avoiding it would be desirable. The invention would of course still work if such calibration efforts were made.

Figure 4:
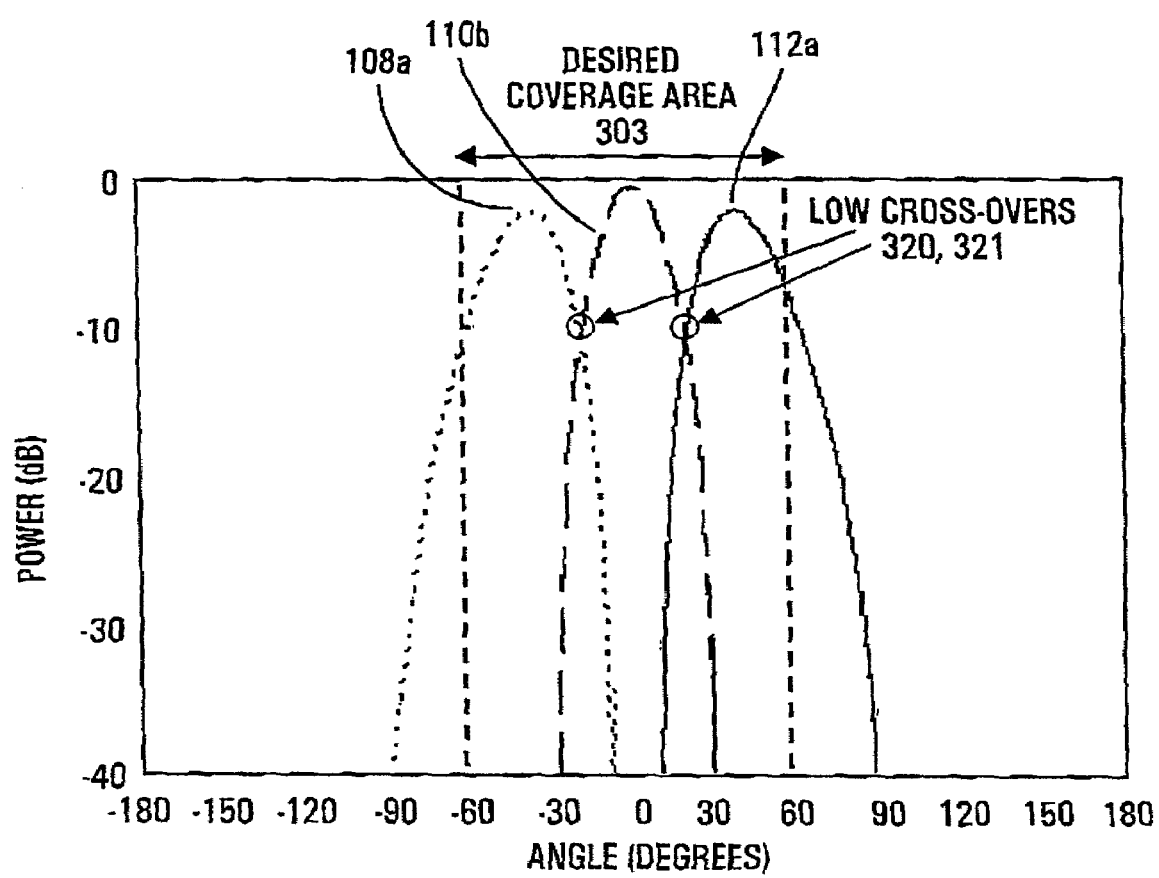
FIG. 4 is a plot of an example antenna power radiation pattern of the wireless transceiver in FIG. 2.

FIG. 4 shows a simulated radiation pattern for the wireless transceiver system 200 illustrated in FIG. 3 for the three adjacent beams 108a, 110b and 112a. Considering the first beam 108a and second beam 110b having +45 degree polarization and −45 degree polarization respectively, the effect of varying the relative phase is that the resultant polarization varies anywhere from being completely in phase to completely anti-phase at the low cross over 320. Thus, there is always power at the crossover angle, but the polarization is uncontrolled. This is not a problem since it is the power of the received signal that is important not its received polarization. A similar situation exists at the low cross over 321 for the beams 110b and 112a.

While the preferred embodiment of the present invention has been described and illustrated, it will be apparent to persons skilled in the art that numerous modifications and variations are possible.

The invention claimed is:

1. An apparatus adapted to transmit a first channel on at least two adjacent beams of a first plurality of beams defining a coverage area, with each pair of adjacent beams of said first plurality of beams partially overlapping and having alternating polarizations;

the apparatus comprising a respective transmitter adapted to transmit on each of said first plurality of beams a respective unique composite signal, each composite signal comprising said first channel and a respective at least one unique traffic channel;

the apparatus being further adapted to receive over a second plurality of beams comprising a corresponding beam for each beam of said first plurality of beams which is substantially co-extensive with the beam of the first plurality of beams and has a respective polarization which is substantially orthogonal to the polarization of the beam of the first plurality of beams.

2. The apparatus of claim 1 adapted to transmit CDMA signals.

3. The apparatus of claim 1 further comprising a respective receiver coupled to receive a respective receive signal over each of said first plurality of beams.

4. The apparatus of claim 1 wherein the respective polarization of each of the first and second plurality of beams is one of two substantially orthogonal polarizations.

5. The apparatus of claim 4 further comprising a first antenna array and a second antenna array, the first antenna array being adapted to produce each beam of said first and second plurality of beams having a first of said two substantially orthogonal polarizations and the second antenna array being adapted to produce each beam of said first and second plurality of beams having a second of said two substantially orthogonal polarizations.

6. The apparatus of claim 5 further comprising a first multiple beam former connected to the first antenna array and a second multiple beam former connected to the second antenna array.

7. The apparatus of claim 5 further comprising a beam forming matrix connected to the first antenna array and the second antenna array.

8. The apparatus of claim 5 further comprising: a respective receiver coupled to receive for each of said first and second pluralities of beams a respective receive signal over the beam.

9. The apparatus of claim 8 further comprising for each pair of beams comprising a beam of said first plurality of beams and a corresponding beam of the second plurality of beams, a respective combiner adapted to perform diversity combining of the receive signals received over the pair of beams.

10. The apparatus of claim 1 further comprising: a respective receiver coupled to receive for each of said first and second pluralities of beams a respective receive signal over the beam.

11. The apparatus of claim 10 further comprising for each pair of beams comprising a beam of said first plurality of beams and a corresponding beam of the second plurality of beams, a respective combiner adapted to perform diversity combining of the receive signals received over the pair of beams.

12. The apparatus of claim 1 further comprising a single dual polarization antenna array adapted to providing said first plurality of beams defining said coverage area, with, each pair of adjacent beams of said plurality of beams partially overlapping and having substantially orthogonal polarizations.

13. The apparatus of claim 1 comprising a dual polarization array adapted to produce all of the beams of the first and second pluralities of beams.

14. The apparatus of claim 1 wherein the plurality of beams are fixed beams.

15. A method comprising:
transmitting a first channel on at least two adjacent beams of a first plurality of beams defining a coverage area, with each pair of adjacent beams of said plurality of beams partially overlapping and having alternating polarization;
transmitting on each of said first plurality of beams a respective unique composite signal, each composite signal comprising said first channel and a respective at least one unique traffic channel;
receiving a respective receive signal over each of a second plurality of beams comprising a corresponding beam for each beam of said first plurality of beams which is substantially co-extensive with the beam of the first plurality of beams, and has a respective polarization which is substantially orthogonal to the polarization of the beam of the first plurality of beams.

16. The method of claim 15 wherein the first channel is a CDMA signal.

17. The method of claim 15 further comprising: receiving a respective receive signal over each of first said plurality of beams.

18. The method of claim 15 wherein the respective polarization of each of the first and second plurality of beams is one of two substantially orthogonal polarizations.

19. The method of claim 18 further comprising: receiving a respective receive signal over each of said first plurality of beams.

20. The method of claim 19 further comprising: performing, for each pair of beams comprising a beam of said first plurality of beams and a corresponding beam of the second plurality of beams, diversity combining of the receive signals received over the pair of beams.

* * * * *